United States Patent [19]
Jackson

[11] Patent Number: 5,280,813
[45] Date of Patent: Jan. 25, 1994

[54] PARTICLE LOADING SYSTEM AND METHOD

[75] Inventor: Miles Jackson, Cobourg, Canada

[73] Assignee: Kraft General Foods Canada Inc., Don Mills, Canada

[21] Appl. No.: 927,102

[22] Filed: Aug. 7, 1992

[51] Int. Cl.5 .................. B65G 65/00; B65B 1/04
[52] U.S. Cl. ......................... 141/4; 141/98; 141/286; 414/293; 239/672
[58] Field of Search ............ 141/1, 4, 98, 286; 239/672, 498, 500, 501, 518; 414/288, 293, 298, 299

[56] References Cited

U.S. PATENT DOCUMENTS

| | | | |
|---|---|---|---|
| 1,068,006 | 7/1913 | Pottinger | 414/293 X |
| 2,611,685 | 9/1952 | Yoder | 414/293 |
| 3,868,028 | 2/1975 | Mausser | 414/299 |
| 3,945,511 | 3/1976 | Delorme | 414/293 |
| 4,253,612 | 3/1981 | Schulze | 279/672 |
| 4,286,883 | 9/1981 | Johanson | 366/137 |
| 4,424,837 | 1/1984 | Farrell | 141/284 |
| 4,433,707 | 2/1984 | Farnham | 141/1 |
| 4,472,102 | 9/1984 | Behringer | 414/299 X |
| 4,548,342 | 10/1985 | Fisher | 222/145 |
| 4,700,893 | 10/1987 | Bugler, III | 239/500 X |
| 4,854,722 | 8/1989 | Jackson | 366/341 |
| 4,972,884 | 11/1990 | Souers et al. | 141/1 |

FOREIGN PATENT DOCUMENTS

| | | | |
|---|---|---|---|
| 4004213 | 7/1991 | Fed. Rep. of Germany | 239/672 |
| 0213816 | 9/1984 | German Democratic Rep. | 239/672 |

*Primary Examiner*—Ernest G. Cusick
*Attorney, Agent, or Firm*—Linn I. Grim

[57] ABSTRACT

A system and method for loading particulate material into a dispenser. This system includes a dispenser for receiving and dispensing particulate material, and a deflection assembly to deflect particulate material fed into the dispenser. The deflection assembly is located adjacent an inlet of the dispenser, and includes a deflection cone and a plurality of outside fins or ribs. In use, a supply of a particulate material is directed onto the deflection cone, and this cone and the ribs connected thereto then direct that material outward and around the interior of the dispenser.

20 Claims, 4 Drawing Sheets

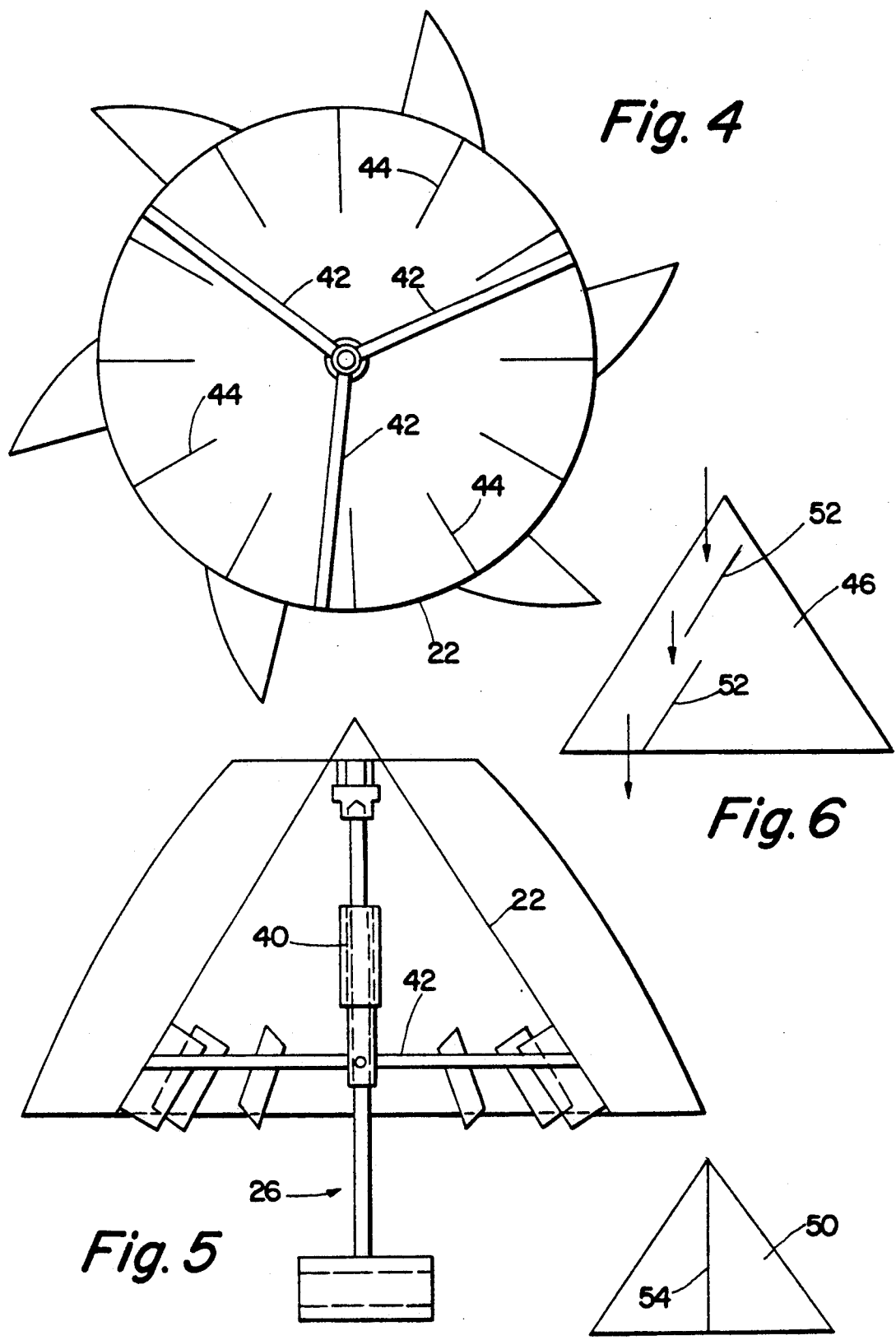

PARTICLE LOADING SYSTEM AND METHOD

BACKGROUND OF THE INVENTION

This invention generally relates to particle loading systems and methods; and more specifically, to systems and methods for loading bulk quantities of particulate materials into dispensing apparatus that are subsequently used to discharge small quantities of the particulate materials.

Various food commodities, such as several cereal products, are often packaged by filling a large dispensing device with a bulk quantity of the commodity, and then dispensing or feeding small quantities of the commodity through a funnel that forms a bottom or lower portion of the dispensing device, into small, individual packages that are then prepared for sale to the consumer.

In some instances, this bulk commodity consists of a blend or mixture of coarse and fine particles. For instance, some cereals include flakes having a range of sizes, and some of these flakes may be quite small while others may be comparatively large. Other cereals include sugar-coated flakes; and during handling and processing, small sugar particles may break away from the much larger flakes. Still other cereal products consist of two or more types of food products, such as flakes and fruit pieces, that have different sizes.

Prior art processes and apparatuses are known for dispensing food commodities of the above-described type; however, difficulties are occasionally encountered with these prior art arrangements. For example, with a food composition that consists of a blend or mixture of coarse and fine particles, the ingredients of the composition tend to segregate from each other as they are poured into and subsequently passed downward through the dispensing device. Typically, the fine particles tend to collect in the center of the dispensing device, while the coarse particles tend to collect toward the sides of that device. Moreover, when such a bulk composition is discharged from the dispensing device, initially product from the center of the device tends to flow out faster than product from the sides of the dispensing device. As a result, the food materials fed into the individual small packages do not always have the desired proportions of the different particulate ingredients.

Because of this, some of those individual packages being filled may be provided with more than the desired weight or mass of the food composition or with more than the desired amount of a particular one of the ingredients of the composition—conditions referred to as overfill. Any overfill of a package increases the cost of that package to the food manufacturer, and this increased cost is exacerbated if the package is overfilled with a more expensive ingredient of the bulk composition. Because the packages are normally sold at a uniform price, regardless of whether the packages are overfilled, the increased cost of an overfilled package is not recovered by the manufacturer but instead is a direct economic loss.

Another disadvantage of the prior art particulate dispensing systems is that some relatively fragile commodities may tend to break apart as they are poured into and passed downward through the dispensing device, and this tends to produce unwanted fine particles in the food commodity. Also, on occasion, the particles will become jammed in the dispensing device. This interferes with the regular filling of the individual packages, and often an appreciable amount of time and effort is required by an operator to restart the flow of the food materials from the dispensing device.

Prior art processes and systems for dispensing food commodities of the above-described type are disclosed, for example, in U.S. Pat. Nos. 4,854,722, 4,548,342, and 4,286,883.

U.S. Pat. No. 4,854,722 discloses a particle dispensing apparatus having a top bin section and a lower discharge section; and this discharge section, in turn, includes a pair of generally concentric cones that form an annulus therebetween. These two concentric cones are positioned and dimensioned, first, to help ensure that the proportions of course and fine particles discharged from the dispensing apparatus remain more constant over time, second, to ensure a smooth and regular flow of that material downward through the dispenser, and third, to reduce the number of food particles that break as they pass through the dispenser.

U.S. Pat. No. 4,286,883 discloses an apparatus for blending bulk particulate solids, and comprising a distribution chute bin and a cone section having outer and inner cones. Particulate material is fed into the chute bin, which is designed to cause mixing of course and fine particles, thereby reducing particle size segregation. The inner and outer cones of the cone section are designed to produce and to maintain a preferred particle flow velocity profile at the bottom of the cone section.

U.S. Pat. No. 4,548,342 discloses a hopper for receiving and then discharging a particulate material. An inner tapered surface extends through an opening at the bottom of the hopper and is supported in an operable position by webs that extend down to an outer tapered surface mounted to the hopper adjacent and below its opening. These tapered surfaces and supporting webs form a multitude of channels that provide additional problems of particle segregation due to the variable flow of solids in each of those channels.

SUMMARY OF THE INVENTION

The present invention is a system and method for loading particulate material into a dispenser; and this system comprises a dispenser for receiving and dispensing particulate material, and a deflection assembly to deflect particulate material fed into the dispenser, outward and around the interior thereof. The dispenser preferably includes a bin section for receiving and holding a supply of the particulate material, and a discharge section for discharging the particulate material from the bin section; and the deflection assembly is preferably located adjacent an inlet of the bin section to distribute particulate material fed thereto around the bin section.

More specifically, the bin section of the dispenser includes an inlet for receiving the particulate material, an interior for holding a supply of the particulate material, and an outlet for discharging that material from the bin section. The discharge section of the dispenser is connected to and extends downward from the bin section to receive particulate material therefrom and to conduct that material downward, and this discharge section forms an outlet opening to discharge the particulate material from the discharge section. The deflection assembly is positioned adjacent the inlet of the bin section and preferably includes a deflection cone having a downwardly outwardly extending outside surface, and a plurality of outside fins or ribs connected to and extending outward from and downward along that outside surface. In use, a particulate material is directed onto the deflection cone, and this cone and the ribs connected thereto then direct that material outward and around the interior of the bin section.

It has been found that using this deflection assembly in this way to distribute the particulate material outward and around the bin section of the dispenser produces a number of advantages. First, there is a substantial improvement in the uniformity with which fine and course particles are distributed around and subsequently discharged from the bin section. As a result of this, the individual packages filled from the dispenser have a much more uniform proportion of fine and course particles, and this significantly reduces the number of such packages that are overfilled. A second advantage of using the deflection assembly of the present invention is that it significantly reduces the number of particles that break apart as the particulate material is fed into the dispenser. This, of course, reduces the amount of fines in that dispenser and the proportion of fines that are discharged therefrom and into the packages that are filled from the dispenser.

In a preferred embodiment of this invention, the deflection assembly is used in combination with a conical insert in the discharge section of the dispenser. More specifically, in this preferred embodiment, this discharge section includes generally concentric inner and outer cones. The outer cone is connected to and extends downward from the bin section of the dispenser and has a first frusto-conical, annularly closed and downwardly inwardly sloping interior surface; and the inner cone is supported within the outer cone and has a second frusto-conical annularly closed and downwardly inwardly sloping interior surface. With this arrangement, the inner and outer cones form an outer annulus therebetween; and a first portion of the particulate material in the dispenser is discharged therefrom through the inner cone, and a second portion of that particulate material is discharged from the dispenser through the outer annulus between the inner and outer cones.

As mentioned above, the deflection assembly imparts both outward and annular movement to the particulate material being fed to the dispenser. In order to impart this annular movement to the particulate material, the deflection assembly may be rotated as that particulate material is directed onto the deflection assembly; and this, in turn, may be accomplished in several ways. For instance, the fins of the deflection assembly may be curved so that downward movement of the particulate material itself against those fins causes the deflection assembly to rotate. Alternatively, a separate drive means, such as an electric or pneumatic motor, may be connected to the deflection assembly to rotate that assembly. The desired annular movement of the particulate material can also be produced by a stationary deflection cone if the fins on that cone are designed and arranged to impart that annular movement to the particulate material. For instance, this may be done by using fins that curve along the cone, or that slant along the cone at an angle to the axis thereof.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 4 is a bottom view of the deflecting assembly.

FIG. 5 is a sectional view through the deflecting assembly.

FIG. 6 schematically illustrates a second type of deflecting cone that may be used in the system of FIG. 1.

FIG. 7 schematically illustrates a third type of deflecting cone that may also be used in the system of FIG. 1.

DETAILED DESCRIPTION OF THE PREFERRED EMBODIMENTS

Figure 1:
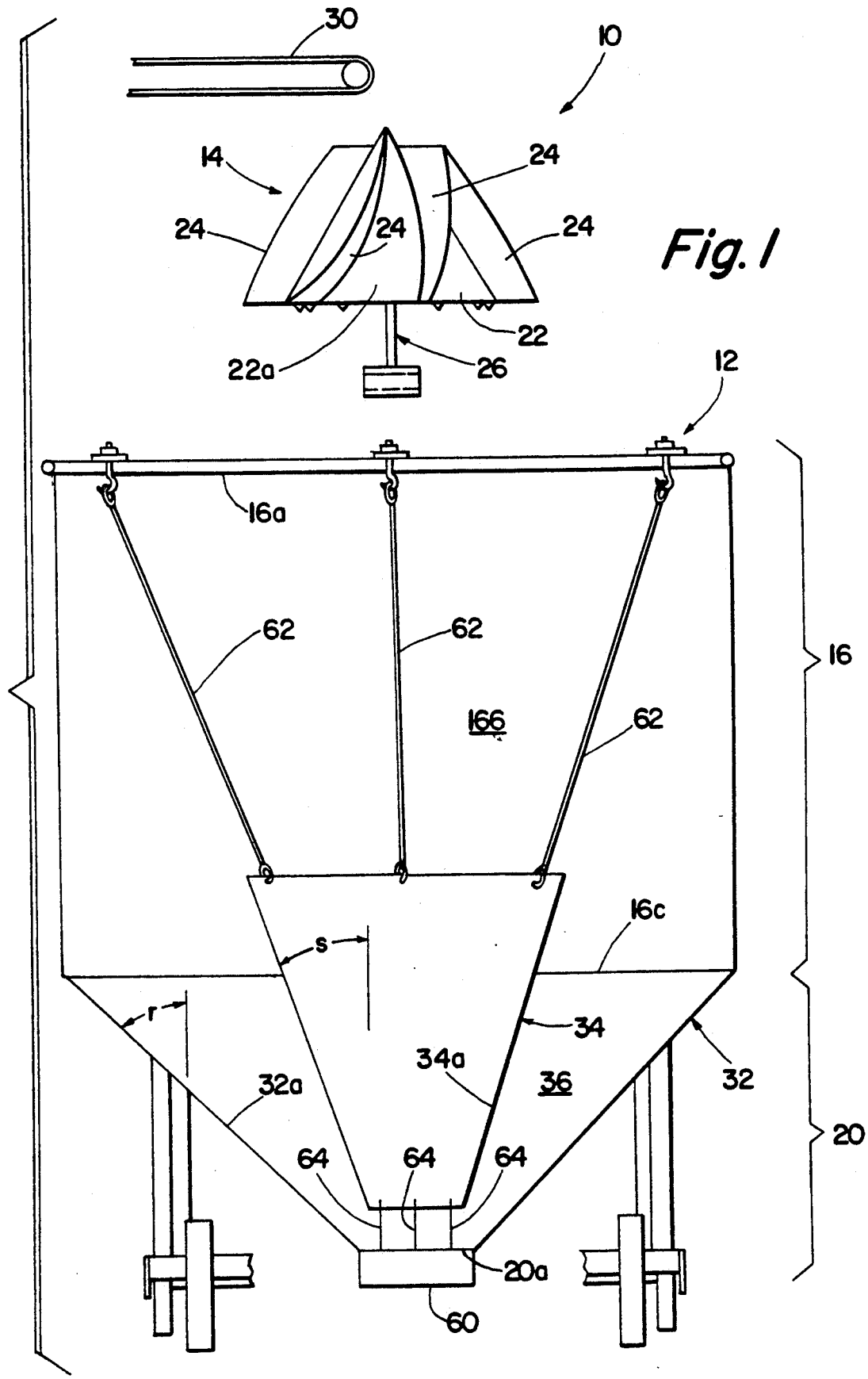
FIG. 1 is an elevation side view showing a particle loading system according to this invention.
Figure 2:
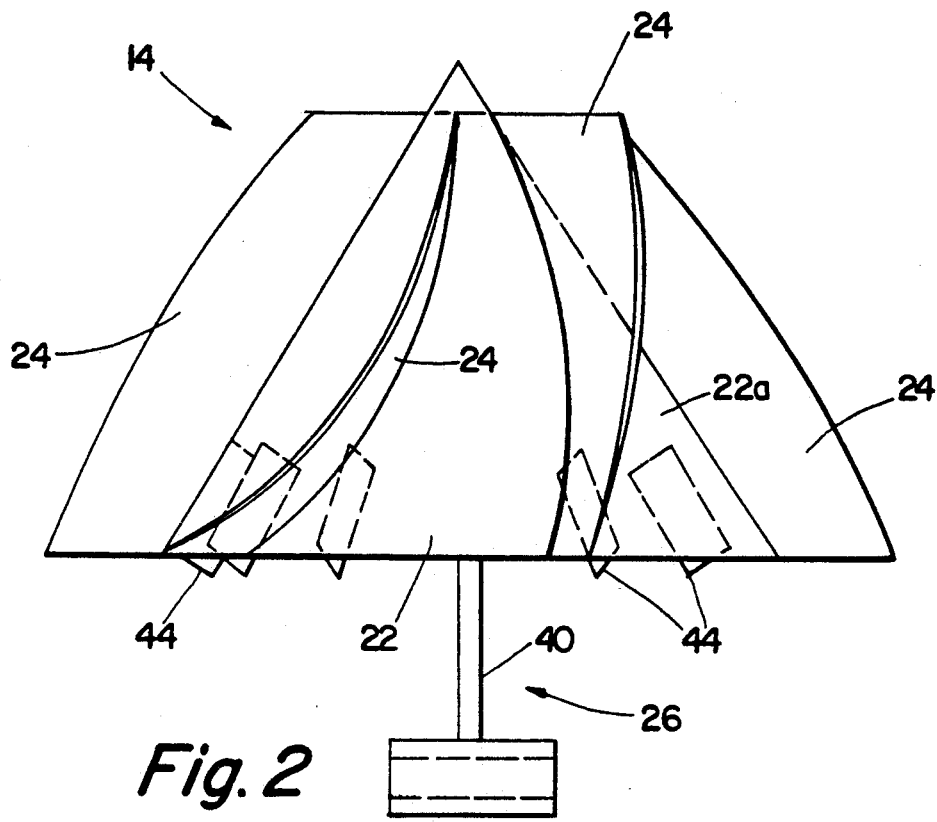
FIG. 2 is an enlarged side view of the deflecting assembly of the loading system shown in FIG. 1.
Figure 3:
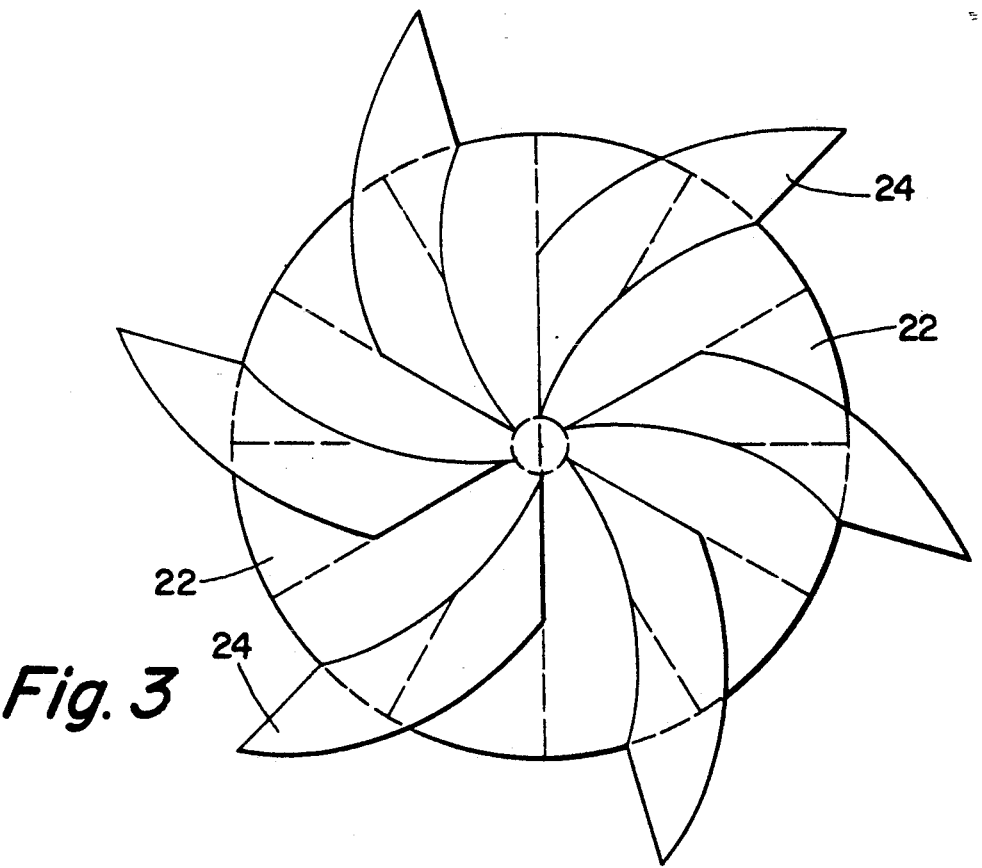
FIG. 3 is a top view of the deflecting assembly.

FIG. 1 illustrate particle loading system 10 comprising particle receiving and dispensing apparatus or dispenser 12 and deflection assembly 14. Dispenser 12 includes bin section 16 and discharge section 20; and deflection assembly 14 preferably includes cone 22, a plurality of fins 24, and support and mounting subassembly 26. Bin section 16 is provided for receiving and holding a supply of a particulate material, discharge section 20 is provided to discharge the particulate material from the bin section, and deflection assembly 14 is provided to distribute around that bin section particulate material fed thereinto. FIG. 1 also schematically illustrates conveyor 30 for supplying or feeding particulate material to bin section 14.

More specifically, bin section 16 includes inlet **16*a* for receiving the particulate material, interior 16*b* for holding a supply of that material, and outlet 16*c* for discharging the particulate material from the bin section. Discharge section 20 is connected to and extends downward from bin section 16 to receive particulate material therefrom and to conduct that material downward, and the discharge section forms outlet opening 20*a* to discharge the particulate material from dispenser 12. Preferably, discharge section 20 includes first and second generally concentric cones 32 and 34 that form an annulus 36** therebetween.

Deflection assembly 14 is located adjacent inlet **16*a* of the bin section to direct particulate material fed thereto outward and around interior 16*b* of the bin section. With the embodiment of assembly 14 shown in FIG. 1, cone 22 is positioned with outside surface 22*a* thereof extending downwardly outwardly, and fins 24 are connected to and extend outward from and downward along that outside surface. Preferably cone 22 is coaxial with bin section 16; and surface 22*a* slopes downward at an angle of between 20° and 40° to the axis of cone 22, and most preferably at an angle of approximately 30° to that axis. In addition, with the preferred embodiment of assembly 14 shown in FIG. 1, cone 22 is positioned slightly above inlet 16*a* of bin section 16**.

Deflection assembly 14 may be supported by dispenser 12, or may be supported independently of the dispenser. For instance, in a typical application, such as shown in FIG. 1, particulate material is fed into dispenser from an overhead means such as conveyor 30 or a chute; and once a given dispenser is filled, that dispenser is moved away from the overhead conveyor or chute, and another dispenser is moved into its place and then filled. This process is repeated until the desired number of dispensers have been filled. In this situation, it may be preferred to support assembly 14 directly below that overhead conveyor or chute, independent of any particular dispenser, so that one deflection assembly can be used with all of the particle dispensers that are filled from that overhead conveyor or chute, and it is not necessary to provide permanently each dispenser with a respective one deflection assembly. In this situation, assembly 14 may be supported, for example, by the mechanism used to support that overhead conveyor or chute, or by another support means that is also independent of that overhead conveyor or chute; and with the embodiment of assembly 14 shown in FIG. 1, subassembly 26 is provided to connect cone 22 to a supporting structure.

Preferably, as mentioned above, deflection assembly 14 imparts both outward and annular movement to the particulate material being directed into dispenser 12. In the preferred embodiment of deflection assembly 14 shown in FIG. 1, the outward movement of the particulate material is caused by the outward slant of surface 22a, and fins 24 are provided to impart the desired annular movement to the particulate material.

This annular movement may be imparted to the particulate material in any one of several specific ways. For instance, cone 22 may be held stationary over bin section 16, and fins 24 may be curved or slanted in the annular direction along surface 22a, so that as the particulate material slides down that surface, fins 24 also cause that material to slide in the circumferential direction over surface 22a. Alternatively, fins 24 may have substantially flat shapes and may be positioned substantially perpendicular to surface 22a, and cone 22 may be rotated as the particulate material is directed onto the cone, so that the fins tend to throw the particulate material in a circumferential direction. The preferred embodiment of assembly 14 employs both curved fins 24 and a rotating cone 22 to impart annular movement to the particulate material. Moreover, preferably the rotating movement of the cone is caused by the particulate material moving downward against the fins of the cone.

FIGS. 2-5 illustrate deflection assembly 14 in greater detail; and with reference thereto, subassembly 26 of assembly 14 includes a vertical, central support means 40 and a plurality of horizontal support rods 42, and the deflection assembly 14 also includes a plurality of inside fins 44 connected to the inside surface of cone 22. Support means 40 is connected to the inside surface of cone 22, adjacent the apex thereof, to support that cone, and support rods 42 are connected to and horizontally extend across a lower portion of the cone to brace the cone; and as shown in FIGS. 4 and 5, preferably rods 42 are connected to central vertical support means 40.

FIGS. 6 and 7 illustrate two alternate deflecting cones 46 and 50 that may be used in system 10. A plurality of flat or planar fins are mounted onto each of these deflecting cones. The fins 52 mounted on cone 46 extend at an angle to the axis of the cone and are staggered along the outside surface thereof. The fins 54 that are mounted on cone 50 extend parallel to the axis of the cone and extend substantially completely from the top to the bottom of the cone.

The various components of deflection assembly 14 may be made of any suitable materials and connected together in any suitable way. For instance, cone 22 and fins 24 may be made from a metal and bolted together. Alternately, cone 22 and fins 24 may be made from a food grade plastic—that is, a plastic material that is suitable for contact with food materials.

With reference again to FIG. 1, dispenser 12, and in particular bin section 16 and discharge section 20 are described in detail in U.S. Pat. No. 4,854,722, the disclosure of which is herein incorporated by reference, and it is not necessary to describe these sections of dispenser 12 herein in detail. In general, though, bin section 16 has a central vertical axis that defines the axis of dispenser 12, and the bin section includes a vertical cylindrical sidewall having a top edge forming inlet 16a and a substantially open bottom forming outlet 16c. A top cover (not shown) having an inlet port or opening may be provided to cover the top of bin section 16.

Outer cone 32 is connected to and extends downward from bin section 16, preferably coaxially therewith; and the outer cone has a first, frusto-conical annularly closed and downwardly inwardly sloping interior surface 32a forming an angle "r" with the vertical. For example, outer cone 32 may be integrally connected to and extend downward from a bottom circumferential edge of the cylindrical side wall of bin section 16. Outer cone 32 terminates in a bottom edge that forms a central outlet opening; and outlet collar 60, which has a generally cylindrical shape, is connected to this bottom edge, extends downward therefrom and defines discharge outlet 20a to discharge material from dispenser 12.

Inner cone 34 is supported within outer cone 32, and the inner cone has a second, frusto-conical, annularly closed and downwardly inwardly sloping interior surface 34a that forms an angle "s" with the vertical. Inner cone 34 terminates in a bottom edge that forms a central outlet, which is directly above and closely adjacent the outlet of outer cone 32. Inner cone 34 may be supported in any suitable way, although preferably the inner cone is releasably held in discharge section 20. For example, as illustrated in FIG. 1, the inner cone may be held in place by a multitude of chains 62, each of which is connected to and extends between bin section 16 and the inner cone.

Centering pins 64 may be connected to the lower portion of inner cone 32 to help maintain the bottom portion of that cone centered within discharge section 20. As shown in FIG. 1, these centering pins are connected to and extend between outlet collar 60 and the lower peripheral portion of inner cone 26.

As mentioned above, outer and inner cones 32 and 34 define outer annulus 36 therebetween; and, in the operation of dispenser 12, a first portion of the composition discharged from bin section 16 is conducted downward through the inner cone 34, and a second portion of the composition discharged from the bin section is conducted downward through outer annulus 36. These first and second portions of the composition remix in the area directly below the outlet of inner cone 34 and are discharged from dispenser 12 via outlet collar 60.

Surfaces 32a and 34a preferably satisfy various requirements. The first of these requirements is that the angle that each of these surfaces make with the horizontal be greater than the "surface friction angle," which is defined as the minimum angle between that surface and the horizontal at which the weight of the solids on the surface overcomes the frictional forces tending to prevent the solids from sliding down that surface.

Additional requirements met by surfaces 32a and 34a relate to a condition referred to as "mass flow," which in general is defined as a condition in which all of the solid material within a hopper is in motion whenever any of that material is being drawn out from the hopper. When a hopper of conical configuration is used to dispense or conduct a particulate material, there is a certain angle, measured between the interior surface of the hopper and the vertical, below which that material will exhibit mass flow but above which it will not. This angle, which is normally empirically determined, is referred to as the "mass flow angle" for that specific combination of hopper and material.

Preferably, in dispenser 12, the angle "s" and the included angle whose magnitude is the difference "r" − "s" are each less than the mass flow angle for the particular composition dispensed from dispenser 12. It is not necessary, and indeed it may be preferred, that angle "r" itself be greater than the mass flow angle for the composition dispensed from dispenser 12.

Dispenser 12 also includes a movable gate (not shown) to control the flow of particulate material from the dispenser. This gate member may be located in, above or below outlet collar 60; and the gate member has a closed position preventing particulate flow outward from the dispensing device, and an open position allowing particulate material to flow outward from the dispensing device. This gate member also may have a number of partially open positions, allowing particulate material to be discharged from dispensing device 12 at various rates.

Dispenser 12 also includes a plurality of wheels connected to discharge section 20 in any suitable way to support the dispenser for movement over a surface. In a typical discharge operation, dispenser 12 is moved over a hole in a floor or similar surface, and a chute is located in that hole and extends downward therefrom to guide material from dispenser 12 and into a multitude of packages that are passed beneath the chute. The above-mentioned control gate is closed to prevent particulate material from being discharged from dispensing device 12, and the entire dispensing device including discharge section 20 and bin section 16 is filled with the desired composition. Then, the above-mentioned control gate is opened to feed material from apparatus 12, through the delivery chute and into small packages passed beneath the dispensing device.

In the above-described embodiment of the invention, outer and inner cones 32 and 34, as well as cone 22, are all frusto-conical right circular cones. However, the present invention is not limited to right circular cones; and the word "cone" is used herein and in the appended claims is defined by the general definition: any surface generated by moving a straight line that passes through a fixed point, along a closed horizontal path spaced from that point.

Figure 8:
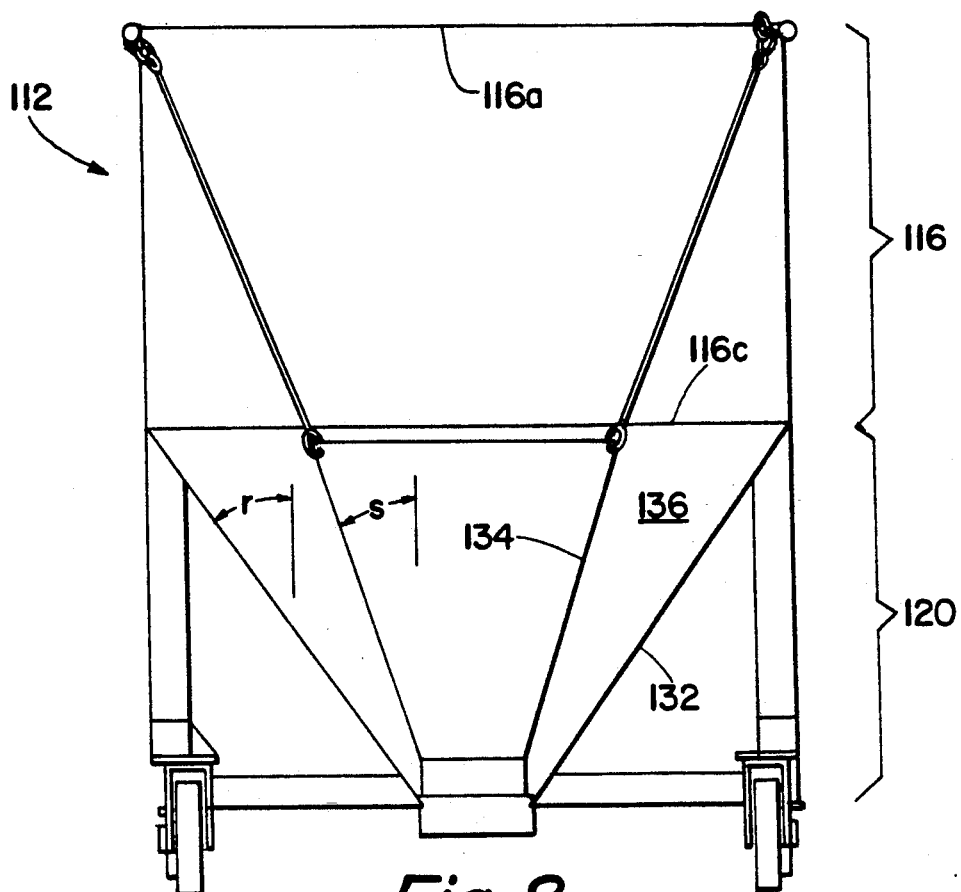
FIG. 8 is a side view of an alternate particle dispenser that may be used in the loading system of FIG. 1.
Figure 9:
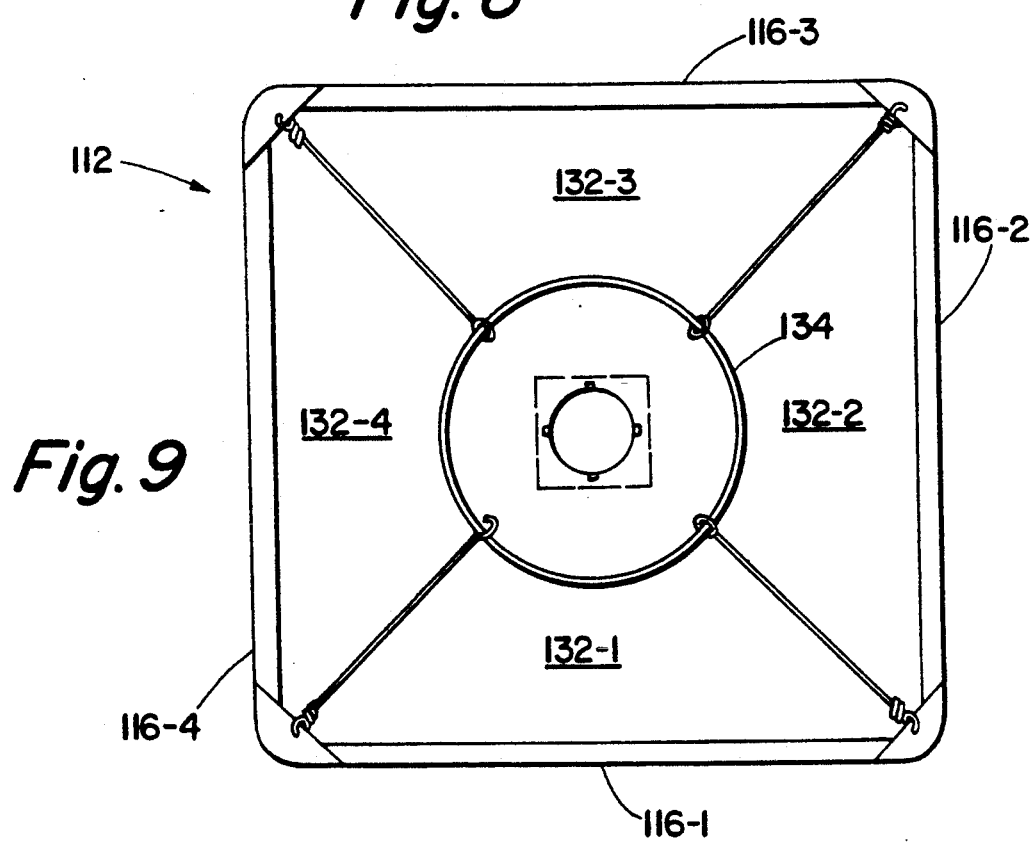
FIG. 9 is a top view of the dispenser shown in FIG. 8.

FIGS. 8 and 9 illustrate an alternate dispensing device 112 that may be used in system 10. Device 112 is generally similar to device 12, and elements of the former device that correspond to elements of the latter device are given the same reference number as that corresponding element but with the added prefix "1." Thus, generally, dispensing device 112 comprises top bin section 116 and discharge section 120. Bin section 116 includes a cylindrical sidewall forming top inlet 116a and bottom outlet 116c. Discharge section 120 is connected to and extends downward from bin section 116 and the discharge section includes outer cone 132 and inner cone 134.

The principle difference between dispensing devices 12 and 112 is that bin section 16 and outer cone 32 of the former device have circular horizontal cross sections, while bin section 116 and outer cone 132 of device 112 have square horizontal cross sections. More specifically, bin section 116 comprises four generally planar wall members, referenced in FIGS. 8 and 9 as 116-1, 116-2, 116-3, and 116-4, and these sections are connected together in a box-shape with open top and bottom ends. Similarly, outer cone 132 includes four generally planar side members, referenced in FIGS. 8 and 9 at 132-1, 132-2, 132-3, and 132-4, that slant downwardly inwardly from the bottom edge of bin section 116. Each of the side members of discharge section 120 has a generally truncated triangular shape, and the bottom edges of these side members form an outlet of the outer cone.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A method of loading a particulate material into a particle receiving and dispensing apparatus, said apparatus comprising a top bin section having an interior for holding a supply of the particulate material, and a discharge section connected to and extending downward from the bin section, said particulate material including a plurality of kinds of particles, the method comprising the steps of:

conducting the particulate material downward toward the top bin section;

deflecting the particulate material outward and in an annular direction to direct the particulate material outward and around the interior of the bin section, and to form a uniform distribution of each of the kinds of particles throughout said supply of particulate material inside the bin section; and filling the discharge section and the bin section with the particulate material.

2. A method according to claim 1, wherein:

the bin section defines an axis;

the conducting step includes the step of directing the particulate material downward generally along said axis; and the deflecting step includes the step of directing the particulate material outward away from and around said axis.

3. A method according to claim 1, wherein:

the deflecting step includes the step of locating a deflecting cone directly above the bin section, said deflecting cone having a central axis and a solid outside surface extending downwardly outwardly from said central axis; and the conducting step includes the step of directing the particulate material onto the deflecting cone.

4. A method according to claim 3, wherein the deflecting step includes the further step of rotating the deflecting cone as the particulate material is directed thereonto.

5. A method according o claim 4, wherein:

the bin section defines an axis;

the locating step includes the step of locating the deflecting cone with the axis thereof coaxial with the axis of the bin section; and the rotating step includes the step of rotating the deflecting cone about the axis thereof.

6. A method according to claim 4, wherein the rotating step includes the step of using the particulate material directed onto the deflecting cone to rotate the deflecting cone.

7. A method according to claim 4, wherein the rotating step includes the steps of:
connecting the deflecting cone to a drive source; and
operating the drive source to rotate the deflecting cone.

8. A particle loading system, comprising:
apparatus for receiving and dispensing particulate material including a plurality of kinds of particles, and including
i) a bin section for holding a supply of particulate material, and having an inlet for receiving the particulate material and an outlet for discharging the particulate material from the bin section, and
ii) a discharge section connected to and extending downward from the bin section, to receive particulate material therefrom and to conduct said particulate material downward, the discharge section forming an outlet opening to discharge the particulate material from the discharge section; and
a deflection assembly located adjacent the inlet of the bin section to deflect outward and around the bin section, particulate material fed into the inlet of the bin section, and to form a uniform distribution of each of the kinds of particles in the particulate material throughout said supply of particulate material in the bin section.

9. A system according to claim 8 wherein the deflection assembly includes:
a deflection cone having a central axis and a solid outside surface extending downwardly outwardly from said central axis; and
a plurality of outside fins connected to and extending outward from and downward along said outside surface.

10. A system according to claim 9, wherein:
the bin section includes a top edge defining the inlet of the bin section; and
the deflection cone is rotatably supported above the top edge of the bin section to facilitate moving said apparatus laterally relative to the deflection cone.

11. A system according to claim 10 further including drive means connected to the deflection cone to rotate the deflection cone.

12. A system according to claim 9, wherein each of the fins has a substantially planar shape.

13. A system according to claim 9, wherein each of the fins has a curved shape.

14. A system according to claim 9, wherein
the bin section defines an axis; and
the deflection cone is coaxial with the bin section.

15. A system according to claim 9, wherein the discharge section includes:
an outer cone connected to and extending downward from the bin section, and having a first frusto-conical, annularly closed and downwardly inwardly sloping interior surface; and
an inner cone supported within the outer cone, and having a second frusto-conical annularly closed and downwardly sloping interior surface to conduct downward a first portion of the particulate material discharged from the bin section;
the inner and outer cones forming an outer annulus therebetween to conduct downward a second portion of the particulate material discharged from the bin section.

16. A system according to claim 15, wherein
the inner cone has an open top end extending over a given area; and
the deflection cone extends directly over an area substantially commensurate with said given area.

17. A system according to claim 15, wherein the deflection cone is made from a metal.

18. A system according to claim 16 wherein the deflection cone is made from a plastic material.

19. A system according to claim 9, wherein the deflection cone extends downwardly outwardly at an angle of between 20° and 40° to said central axis.

20. A system according to claim 10, further including means to conduct the particulate material into the bin section; and wherein the deflection cone is positioned directly between said means to conduct and the inlet of the bin section.

* * * * *